United States Patent [19]
Seymour

[11] 3,985,246
[45] Oct. 12, 1976

[54] BALE RETRIEVING AND TRANSPORTING APPARATUS

[75] Inventor: Shaun A. Seymour, New Holland, Pa.

[73] Assignee: Sperry Rand Corporation, New Holland, Pa.

[22] Filed: Aug. 19, 1974

[21] Appl. No.: 498,783

[52] U.S. Cl. ............................. 214/82; 214/510; 214/767
[51] Int. Cl.² ......................................... B60P 1/00
[58] Field of Search .......... 214/514, 510, 82, 146 E, 214/766, 768, 778, 144, 130 C, 767, 730, 731, 511, 131 A

[56] References Cited
UNITED STATES PATENTS

| | | | |
|---|---|---|---|
| 2,397,046 | 3/1946 | Richey | 214/82 X |
| 2,518,105 | 8/1950 | Werth | 214/766 |
| 2,742,167 | 4/1956 | Brudi | 214/514 |
| 2,975,924 | 3/1961 | Kopanski | 214/731 |
| 3,208,612 | 9/1965 | Blair | 214/144 |
| 3,325,023 | 6/1967 | Coleman | 214/731 X |
| 3,403,800 | 10/1968 | Botello | 214/511 |
| 3,712,496 | 1/1973 | Miller | 214/511 |
| 3,837,516 | 9/1974 | Meyer | 214/82 |
| 3,876,090 | 4/1975 | Holland | 214/131 A |

*Primary Examiner*—Albert J. Makay
*Attorney, Agent, or Firm*—John R. Flanagan; Frank A. Seemar; Michael R. Swartz

[57] ABSTRACT

The present invention is directed to a bale retrieving and transporting apparatus used in conjunction with a tractor. This apparatus includes both a lower and rear supporting structure to retrieve and support the bales. Mounted to the rear supporting structure is a means for discharging the bale from the apparatus.

3 Claims, 3 Drawing Figures

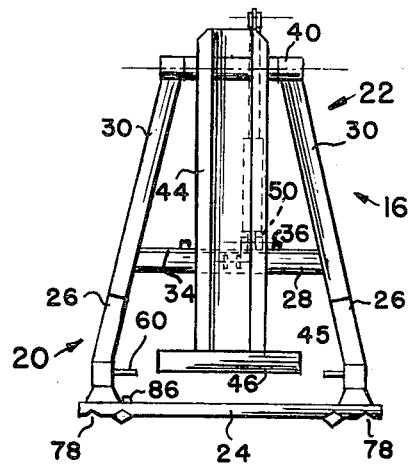
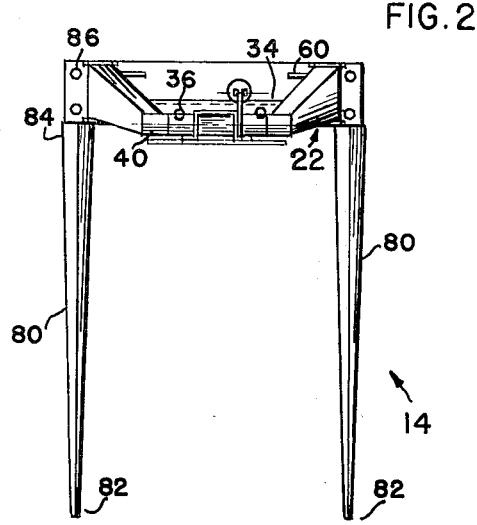
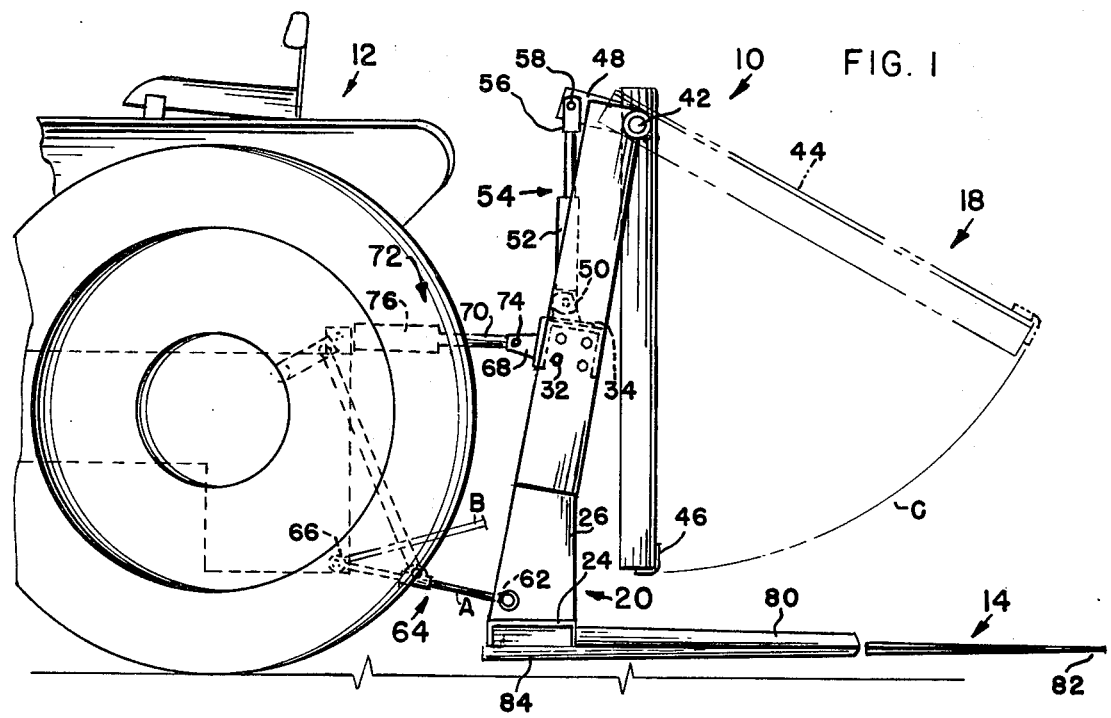

3,985,246

BALE RETRIEVING AND TRANSPORTING APPARATUS

BACKGROUND OF THE INVENTION

The present invention relates to bale handling devices and more particularly to a bale retrieving and transporting apparatus.

Recently, the trend in the agricultural industry has been towards larger and more complex operations. These operations are considerably more economical and advantageous to both farmers and consumers. One recent development in the agricultural industry has been the increased use of large bales of forage material. These bales are generally five to eight feet in diameter and weight approximately 1,000 to 3,000 pounds. These bales have added new dimensions to farming in that, due to their size and compactness, they have a tendency to shed water so as to be able to remain in the field for long periods of time. However, many farmers wish to transport these bales to a sheltered area thereby leaving only such bales in the field as will be necessary to feed his livestock. Due to the size and nature of these bales they are not suitable to presently available bale retrieving and transporting devices.

Several manufacturers have recognized this need to transport large bales of forage material. One of these manufacturers, Starline Inc., has been assigned U.S. Pat. No. 3,779,208, issued to Gay, which is directed to such a retrieving and transporting device. This device is adapted to retrieve, transport and unroll large round bales of forage material. However, removing bales positioned on this device has been difficult. This difficulty arises due to the fact that the bales, once positioned on the lower supporting structure, i.e. tines 15 FIG. 1 of U.S. Pat. No. 3,779,208, will flatten out due to the weight of the bale, thereby creating a flat bottom which will not easily move off of the lower supports. Movement of the bale off of the apparatus disclosed in the Starline patent is accomplished by simply tilting the forward ends of the lower support structure, e.g. tines 15, and having the bale roll or slide off of the structure. However, after the bottom of the bale has been compressed the tendency of the bale to move greatly decreases.

The present invention is directed to this very problem and, therefore, incorporates in its combination a means mounted on the apparatus for discharging the bale where and when desired.

OBJECTS AND SUMMARY OF THE INVENTION

It is the primary object of the present invention to provide a bale retrieving and transporting apparatus adapted to be used in conjunction with a tractor, or other similar vehicle, which can retrieve and transport large bales of forage material.

Another object of the present invention is to provide a bale retrieving and transporting apparatus adapted to be used in conjunction with a tractor which will facilitate in the transportation of large bales of forage material.

Another object of the present invention is to provide a bale retrieving and transporting apparatus, adapted to be used in conjunction with a tractor, which incorporates in its structure a means for discharging the bales from the apparatus.

A further object of this invention is to provide a bale retrieving and transporting apparatus for use with a tractor employing a three point hitch.

The present invention is directed to a bale retrieving and transporting apparatus adapted to be mounted to an agricultural vehicle (e.g. tractor). The bale retrieving and transporting apparatus uses a lower supporting structure for engaging and supporting the lower portion of the bale and a rear supporting structure, which is mounted to and extends substantially vertically from the lower supporting structure, for supporting the bale once it is on the lower structure. This apparatus also includes means mounted to the rear supporting structue for discharging the bale from the apparatus.

The above noted objects and advantages of this invention will be apparent to those skilled in the art after a consideration of the following detailed description taken in conjunction with the accompanying drawings in which the preferred form of this invention is illustrated.

BRIEF DESCRIPTION OF THE DRAWINGS

FIG. 1 is a side view of the apparatus.
FIG. 2 is a plan view of the apparatus.
FIG. 3 is a front view of the apparatus.

DETAILED DESCRIPTION OF THE PREFERRED EMBODIMENT

In the following description right hand and left hand reference is determined by standing to the rear of the bale retrieving and transporting apparatus and facing its direction of movement during its bale retrieving operation.

The bale retrieving and transporting apparatus 10 of the present invention includes a lower supporting structure 14, a rear supporting structure 16 and a bale discharging means 18.

The rear supporting structure 16 generally consists of two portions, a lower bracing structure 20 and an upper extension member 22. The lower bracing structure includes a steel, or similar material, channel member 24, upon which is rigidly mounted, by welding or the like, substantially vertically disposed steel box sections 26. A steel box section 28 is positioned horizontally relative to member 24. Horizontal box section 28 is affixed to the inner portions of vertical box sections 26.

The upper extension member 22 consists of channel members 30 which slide over the outside walls of box sections 26. Channel members 30 are retained in place by nuts and bolts 32 which pass through apertures (not shown) contained in both box sections 26 and channel members 30.

As shown in FIGS. 2 and 3, a fastening channel 34 is secured by bolts 36 to horizontal box section 28. This channel contains flanges (not shown) which are welded to its outer end. These flanges are located so as to fit inside channel members 30. They also contain apertures which, when aligned with apertures in vertical box section 26, permit bolts 32 to pass therethrough thereby further securing channel members 30 to box sections 26.

Interconnecting the uppermost portions of channel members 30 is shaft 40. This shaft is journalled in openings 42 contained in channel members 30. Rigidly secured, by welding or the like, to shaft 40 is channel member 44. Channel member 44 is situated in front of member 28 and has its lower end 45 positioned substantially adjacent lower supporting structure 14. A bale contacting plate 46 is welded to end 45. This contacting plate has rounded edges which do not protrude into the bale. An activating arm 48 has one end rigidly secured to shaft 40 so that any movement of the activating arm will impart a corresponding movement to shaft 40 and channel member 44. A clevis 50 is welded to the top of fastening channel 34. This clevis secures the barrel end 52 of controlling hydraulic cylinder 54 to the rear supporting structure 16. The rod end of cylinder 54 contains clevis 56 which is secured to activating arm 48 by the insertion of pin 58 through both the clevis 56 and an aperture (not shown) contained in arm 48. Suitable hydraulic lines (not shown) interconnect cylinder 54 and the hydraulic system of tractor 12.

To mount the rear supporting structure to the tractor the box sections 26 contain mounting pins 60 which are positioned through the sections. These pins are adapted to receive ends 62 of rigid links 64. The other ends 66 of links 64 are connected to the tractor and are hydraulically movable between positions A and B, as illustrated in FIG. 1. Clevis 68 is rigidly secured to the rear of channel 34. This clevis receives the rod end 70 of hydraulic cylinder 72 and is secured to the rod by pin 74. The barrel end 76 of cylinder 72 is suitably mounted to tractor 12. As with cylinder 54, cylinder 72 has hydraulic lines (not shown) which interconnect the hydraulic system of the tractor of this cylinder. The above described interconnection between tractor 12 and the rear supporting structure, consisting of rigid links 64 and hydraulic cylinder 72, is commonly referred to as a three point hitch.

Channel member 24 includes triangular shaped notches 78 integrally formed in the member. These notches ar arranged at various positions along the channel member to vary the width of the lower supporting structure.

The lower supporting structure 14 consists of tines 80 which have a generally rhombic shape. These tines have tapered end portions 82 which are adapted to be easily inserted under a bale. Apertures (not shown) are included in both channel member 24 and end 84 of the tines. When these apertures are aligned, bolt assemblies 86 can be inserted therethrough to secure the tines in a substantially horizontally aligned position. Removal of bolts 86 will permit tines 80 to be easily removed or adjusted as desired by the operator.

OPERATION

In operation, a farmer will back his tractor, containing the bale retrieving and transporting apparatus of the present invention, towards a bale. The tapered ends 82 of tines 80 will then be lowered to their lowest position. The shape of the tines and their position with respect to the bale will permit them to move below the bale. Once the bale is positioned on the tines, the operator will raise rigid links 64 and retract the rod 70 of cylinder 72 so that the apparatus is in a transport position.

To discharge the bale, the operator will lower tines 80 to their lowest position. Then he will activate the controlling hydraulic cylinder 54 so that rod 56 is retracted. The retraction of rod 56 will cause activating arm 48 to move counterclockwise thereby moving channel member 44 and contacting plate 46 along arc C. This movement of channel member 44 will discharge the bale from tines 80 even if the bottom most portion of the bale has become compressed or flattened.

While the preferred structure in which the principles of the present invention have been incorporated is shown and described above, it is to be understood that the invention is not to be limited to the particular details, shown and described above, but that, in fact, widely different means may be employed in the practice of the broader aspects of the invention.

Having thus described the invention, what is claimed is:

1. A large round forage bale handling apparatus, adapted to be mounted on a vehicle and operable to retrieve, transport and discharge large round bales, said apparatus comprising:
    a. a load support means disposable in a plane generally parallel to the ground and being adapted to support large round bales thereon, said load support means including a pair of spaced apart tines adapted at their terminal ends to be slipped beneath a large round bale for retrieving the same;
    b. a frame secured to one end of said load support means opposite said terminal ends of said tines and adjacent said vehicle and extending upwardly therefrom and bent inwardly of said tines and inclined and facing towards said terminal ends of said tines of said load support means such that an upper end of said frame overlies said tines at a position spaced upwardly therefrom when said load support means is disposed generally parallel to the ground;
    c. discharge means having a free end constituting a bale engaging portion;
    d. means for pivotally mounting said discharge means proximate its upper end to said upper end of said frame such that said upper end of said discharge means overlies said load support means when the same is disposed generally parallel to the ground, said discharge means being pivotally movable from a lower retrieving position, wherein it extends adjacent said frame and generally downwardly, forwardly of, and along a generally vertically extending surface portion of the large round bale resting on said tines, along a rearwardly and upwardly extending arcuate path, during which said bale engaging portion of said discharge means is capable of slideable engagement upwadly along said surface portion of the large round bale for moving the bale toward the terminal ends of said tines, to a discharge position, wherein said engaging portion of said discharge means is displaced generally above said terminal ends of said tines at a height sufficient to complete the movement of the bale past the terminal end of said tines and thereby the discharge of the bale therefrom; and
    e. hydraulic means mounted on an intermediate cross brace on said frame and extending upwardly therefrom and operably connected with said discharge means proximate said upper end thereof for moving said discharge means along said arcuate path between said large round bale retrieving and discharge positions.

2. A bale handling apparatus, as described in claim 1, wherein the bale engaging portion of said discharge means is disposed forwardly of said pivotal mounting adjacent the lower portion of said frame when said discharge means is in its retrieving position.

3. A bale handling apparatus, described in claim 1, wherein said discharge means in the bale retrieving position is inclined downwardly and forwardly toward the lower portion of said frame such that the forwardly most portion of a bale supported on said spaced apart tines is disposed forwardly and below the pivotal mounting of said discharge means.

* * * * *